Jan. 21, 1936.  J. KARMAZIN  2,028,455
HEADER CONSTRUCTION
Filed Nov. 14, 1933    2 Sheets-Sheet 1
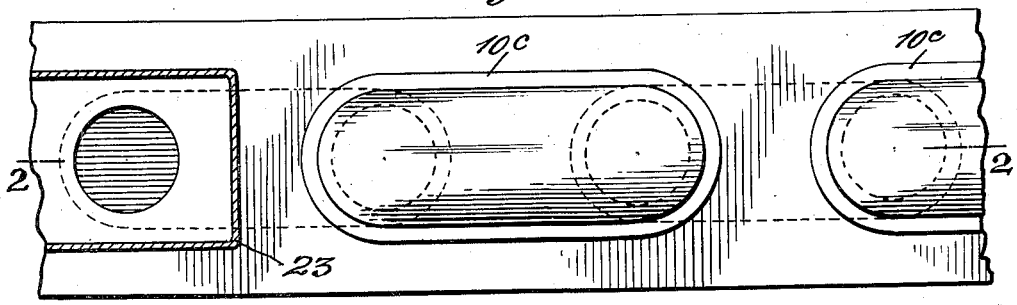
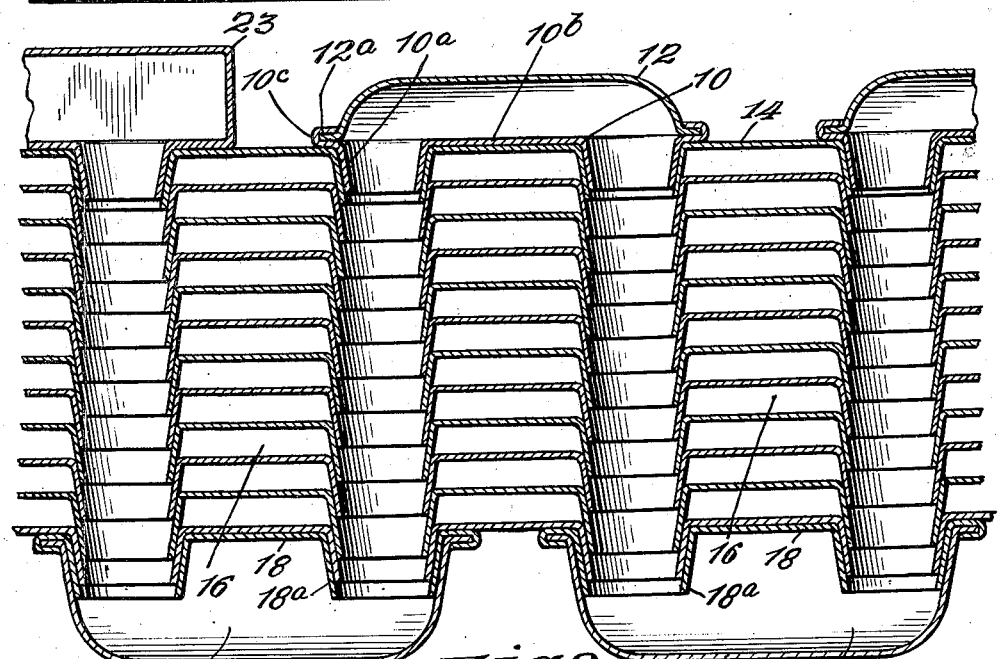
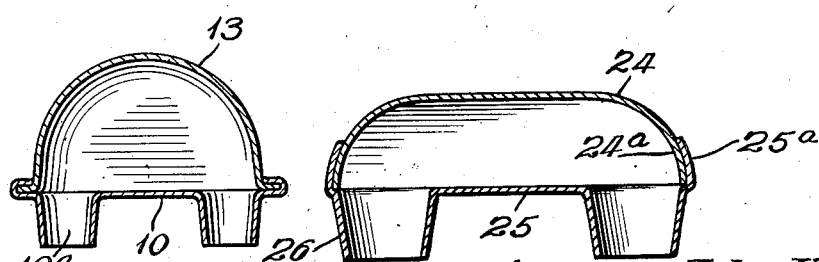
INVENTOR.
John Karmazin
BY
ATTORNEYS Jan. 21, 1936.   J. KARMAZIN   2,028,455
HEADER CONSTRUCTION
Filed Nov. 14, 1933   2 Sheets-Sheet 2
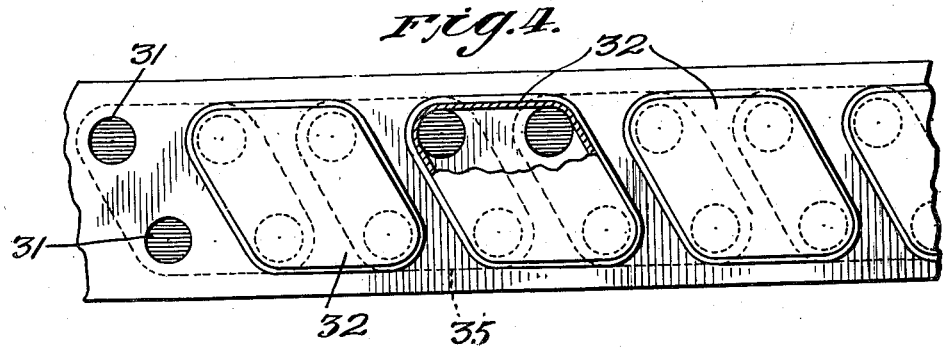
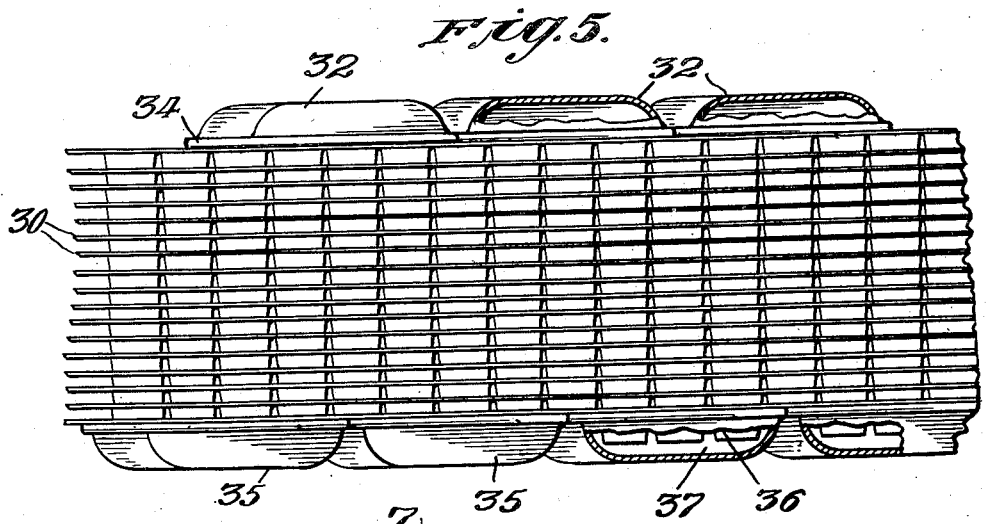
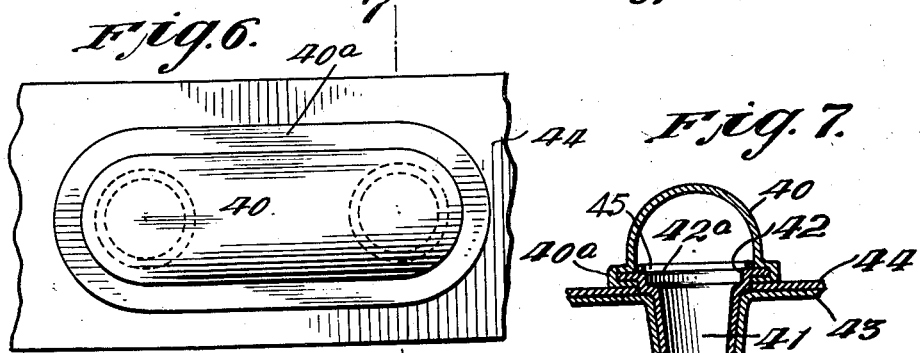
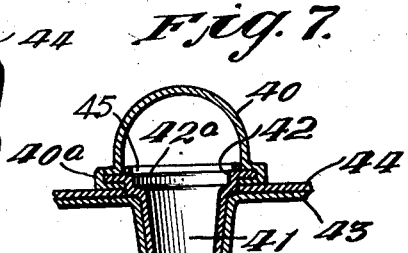
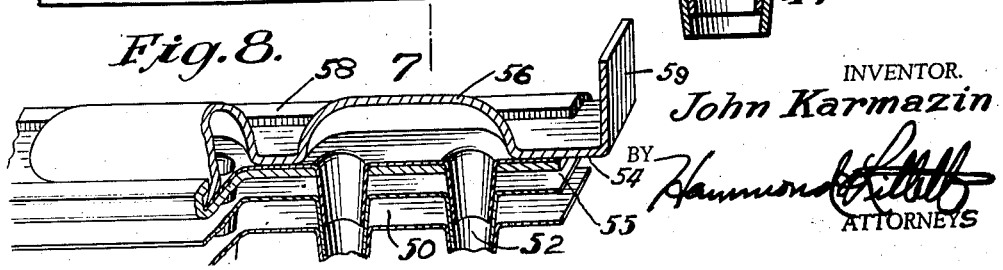
INVENTOR.
John Karmazin
BY
ATTORNEYS Patented Jan. 21, 1936

2,028,455

UNITED STATES PATENT OFFICE 2,028,455

HEADER CONSTRUCTION

John Karmazin, Huntington, Ind., assignor to Karmazin Engineering Company, a corporation of Michigan Application November 14, 1933, Serial No. 697,924

19 Claims. (Cl. 257—148)

This invention relates to heat exchangers and more particularly to stamped sheet metal connector elements for connecting two or more radiator conduits into fluid relation.

One of the principal objects of my invention is to provide a connection for adjacent tubular conduits in a fin and tube type heat exchanger which is more economically made, having greater rigidity and is less bulky in overall size than present forms of connectors.

Another object of the invention is to provide a connection for such a radiator which more closely fits the end of the radiator for better heat exchange and is particularly satisfactory for copper brazed steel construction.

Another and further object of the invention is to provide a depressed sheet metal strip of a suitable size and shape which is simultaneously adapted to connect such conduits in the fin and tube radiator as have been selected to be placed in fluid relation and also to act as a support for the radiator.

A further and more specific object of the invention is to provide a sheet metal adapter and a second sheet metal cap to cooperate therewith to form a sealed conduit between desired ends of the radiator tubes.

A still further object is to provide a connector for connecting the radiator conduits in series, parallel, or multiple series as desired, such connector being such as to cooperate with two or more tube ends simultaneously.

Another object of the invention is to provide a U connector for radiator conduits which is of greater strength, having no overstressed or understressed metal and which may be more easily welded or brazed, particularly with the copper brazed steel construction and in which the cost of construction and assembly is materially reduced over the prior known constructions.

Another object of the invention is to produce an improved connector for fluid conduits in an integral fin and tube type radiator which is provided with a flange connection rather than the taper of the U tube whereby more positive sealing is insured.

Further objects and advantages of this invention will appear from the following description thereof taken in connection with the attached drawings which illustrate preferred forms of embodiment thereof and in which;

Figure 1 is a top plan view of a radiator of the integral fin and tube type showing one form of U tube connector secured thereto;

Figure 2 is a vertical section of the radiator and header connector construction shown in Figure 1 and taken substantially on the line 2—2 thereof;

Figure 2a is a vertical section through a modified form of radiator connector;

Figure 3 is a vertical section through a still further modified form of radiator connector;

Figure 4 is a plan view partly broken away of a still further modified form of construction in which the radiator connector is provided for quadruple connection;

Figure 5 is a side elevation with parts broken away showing the modified form of construction of Figure 4;

Figure 6 is a plan view of a still further modified form of construction in which the cap is secured under the fin adapter element;

Figure 7 is a central vertical section substantially on the line 7—7 of Figure 6, and, Figure 8 is a partial side elevation of the continuous form of connector and support.

In the prior known constructions of heat exchange radiators it has often been found desirable to inter-connect individual conduits so that the fluid would flow in series or parallel relation through them. In such a construction U tubes have been used, but U tubes are quite expensive as they are usually made of pipe bent through 180 degrees, causing not only an overstressed metal condition both on the top and bottom, but the tubes project considerably beyond the radiator cores. Furthermore, they had to be carefully protected against accidental displacement, required a considerable degree of fitting in assembly to make the joints tight, and were extra equipment which could not readily be made on machines normally used for stamping separable radiator elements.

In the present construction I have provided a so-called U or reverse connector or individual header which may extend over and join two or more conduits and which is preferably formed entirely of sheet metal. This connector in one form consists of two elements, the fin tube adapted 10 and the cover or cap member 12. The cover member 12 is also preferably made of sheet metal and is preferably symmetrical in shape and has gently rounded corners and may readily be made on a suitable press. This cover member 12 for the same size of conduits, extends beyond the end of the heat exchanger but approximately one-third the height of the prior forms of U tube although it may be more if desirable.

The fin tube adapter 10 is preferably made on a similar press to the press that the fin tube elements 14 of the radiator cores 16 are made. The adapter element will thus have a corresponding size of tubular projection 10a projecting from a similar fin element 10b. If desired, the element may be individual to each group of tubular conduits connected as shown in Figures 1 and 2 or continuous as shown in Figure 8.

The details of the first construction are shown in Figures 1 and 2 and the fin adapter element 10 is provided with an extended fin edge 10c which may be bent into flanging relation with the projecting edge 12a of the cap element. After assembly, the flange 10c of the adapter element 10 is forced into a mechanically tight contact with the edge 12a in such manner that the connector is integrally secured to the radiator cores and then the cap or cover element 12 may be welded or soldered. The result is that the U connector is an integral part of the radiator core. Such construction affords a tighter joint inasmuch as the contact is around the periphery of the cover member 12 and may be made initially tight by external pressing. Although there is a greater circumference of joint than in the usual U tube connector, this may be readily soldered giving a lesser unit strain and due to the mechanical as well as soldered sealing, the joints are less subject to external damage. The cover member is also made on a suitable press and may have a low flat shape so that it extends a minimum above the core. There is therefore, little danger of breakage. Furthermore, as there is no complete bending, such as in a U tube, the connector is not liable to be damaged by internal strains. As all of the parts are pressed, sheet metal in the preferred form, a considerable economy exists over the purchase or separate manufacture of the entirely separate and distinct U tubes otherwise necessary. With this construction it is also unnecessary to have the precise fitting which is required with U tubes in which the tapered projections must be exact whereas in the present construction the fin element of the adapter is overlapped over the other member and forced tight.

It is possible to form the fin tube adapter in either a female or male construction by slightly changing the proportions. The female construction for full flow is shown at the bottom of Figure 2 and the projecting conduits 18a of the female adapter 18 extends into the chamber 20 formed by the cap or cover 22. In such a construction the cap 22 is of greater depth than the cap 12 shown in the first or male construction at the top of Figure 2 and is preferably semicylindrical in major diameter. This permits the projecting conduits to extend into this chamber and prevents turbulence during flow of liquid from one conduit to the other. This is a preferred form when there is adequate room. The cap is similarly secured to an adapter by means of suitable flange extensions and suitable welding or soldering as in the first case.

The full flow, non-turbulent header may also be used at the top or male end of the core by making the cover 13 as shown for example in Figure 2a. This cover portion is smoothly rounded on the interior and the ends are substantially flush with the adjacent margin of the tubes.

The conduits may be connected into a source of fluid by the header 23 or by any suitable tubular conduit connected into the tubular conduit. In the form of device shown in Figure 1, a series relation exists for a single path of continuous flow of fluid throughout the radiator or heat exchange unit. It is also possible by a chosen arrangement of connectors to provide one or more paths of flow, either in single or double rows and in series or parallel or multiple series relation. It is possible also to have the double row radiators in staggered or alined relation as to the tubes.

Another modified form of construction is shown in Figure 3 in which the cap member 24 may be depressed from a suitable strip of sheet metal and has continuous edges 24a forming a substantial hood. The adapter element 25 is provided with elongated edge flanges 25a which overlap the cap member through a substantial portion of its depth and the members may be soldered or brazed to form a secure bond which is thus reinforced throughout the height. In such a construction the tubular projections 26 may obviously be depressed out of the connector for the male U tube construction, or may be depressed into the adapter and chamber formed by the cover as shown in Figure 2 for female construction.

The improved form of connector is also particularly adapted for connecting more than two tubes or conduits simultaneously. A radiator section or core 30 with the conduits 31 connected in multiple series or other relation and with a junction made between more than two conduits at one time is not possible with the usual U tube which has but two ends. By my construction, however, I am enabled to place a cover member 32 over the adjacent ends of three or more conduits as shown in Figures 4 and 5 for example. The adapter 34, which may be similar to that heretofore shown and integrally secured to the core cooperates with the cover member to form the transferring passage or individual header, over the ends of the four tubes. Flanges on the adapter are similarly sealed to flanges on the cover and sealed as desired.

The cover members 35 used at the bottom of the radiator section 30 differ from the adapters at the top of the tubes in that the projections extend into the cover members 35 forming conduits 36 and 37, whereas, at the opposite end the tubular projections extend into the conduits 31. As shown in Figure 4, the cover members 32 are adapted to cover four conduits, but it is to be understood that any number more than two may be covered equally as well.

A further modified form of construction is shown in Figures 6 and 7 in which the connector is particularly adapted for copper brazed steel radiator elements. In this construction the connector is provided with a cap or cover 40 adjacent the ends of tubular conduits 41 and a cooperating fin tube adapter element 42 forms the bottom of the connector. The adapter element 42 is preferably made of the same material as the fin element 43. A suitable supporting bracket 44 may be placed between the adapter 42 and fin element 43.

The top fin element 43 of the radiator cores is mounted just below the bracket, and the fin adapter 42 thus extends through the bracket 44 to support the core of the radiator. The cap element 40 is provided with suitable flanges 40a which engage under the adapter element 42 which is provided with a raised flange 42a, in such a manner that the flange of the cap element will project under the adapter element flange and when forced tight the joint will form an integral connection between the cap member 40 and the adapter member 42. If desired a copper wire 45 may be inserted above the flange 42a and as the radiator element is brazed at the necessary high temperature, the copper will form the proper joint and will give a very clean copper coated surface without leaks. It will thus be unnecessary to use solder inside at all.

In some constructions it may be desirable to provide a continuous header strip with the individual cover elements drawn therefrom at any determined spacing. This construction is more clearly shown in Figure 8 in which the radiator core 50 is provided with a plurality of individual tubular conduits, preferably made of the fin and tube construction.

A single cover member 54 comprising a plurality of drawn connector elements 56 cooperates with a continuous reinforcing element 58 which is formed to cooperate with the last fin and tube element of the radiator core, which serves as the adapter element and forms part of the water path. In the particular construction shown, the reinforcing element is placed between the last two fin and tube type elements 55 and then the cover plate 54 is secured thereto. This may be done by flanging over the marginal edges of the reinforcing element 58 over the cover plate 54 and welding, soldering or otherwise securing the parts together. The cover element may also be directly welded to the adapter element, but the reinforcing element increases the strength for high pressure application. If desired, an extension 59 of the cover may be used for a support for the radiator.

It is also possible to draw the pocket or cover elements 56 in different relations to cover three or more ports at the end of the tubular conduits and they may be a series or parallel connections as previously described. The continuous header thus has the advantage of requiring fewer parts to handle and may be made in a continuous machine, although in other respects it is similar to the previous form of connector and may similarly be provided with a flange to cooperate with a flangeless adapter. It can be sealed all along the periphery as well as the transverse points between cover elements and will give additional rigidity to the heat exchanger.

While I have shown a preferred form of embodiment of the device, I am aware that other modifications may be made therein and I therefore desire a broad interpretation of my invention within the scope and spirit of my disclosure and of the claims appended hereinafter.

I claim:

1. In an integral fin and tube type heat exchange unit of the class described having a plurality of transverse tubular passages therein forming a core, means to connect some of said passages into a continuous passage, said means including a cover member cooperating with the end of the core to form a fluid path.

2. In a heat exchange element of the class described a plurality of telescoped integral fin and tube type elements and means to connect adjacent tubular conduits to each other including a cover member, and means to integrally secure said cover member to the exterior fin element.

3. A sheet metal header for a radiator core having a plurality of fluid conduits, comprising an adapter element cooperating with a plurality of fluid conduits and a cover member secured to said adapter element in fluid tight relation.

4. A heat exchange unit of the integral fin and tube type comprising a plurality of fluid passages formed of nested tubular projections having fin members integral therewith, and means at the end of said fluid passages for connecting the end of one passage to the end of an adjacent passage to cause the fluid to flow in a continuous path therethrough, said means including a plurality of separate sheet metal members, and means to secure one of said sheet metal members to the heat exchange unit between adjacent fin members thereof.

5. A heat exchange unit comprising a plurality of superposed sheet metal fin elements each having integral tubular projections in parallel spaced relation extending transversely from one side thereof, the tubular projections on one element being nested within the juxtaposed element to form a plurality of continuous tubes, and a metal element cooperating with the end fin element to connect the ends of said tubes to form a continuous conduit, and means for connecting the ends of said conduit into a fluid system.

6. In an integral fin and tube type radiator having a plurality of transverse fins in integral relation with telescoped tubular projections forming transverse conduits from end to end of the radiator, a connector for connecting more than two conduits into a single conduit, said connector including an adapter element corresponding to the last adjacent fin element and having similar tubular projections in cooperative relation thereto and a cover element secured to said adapter element, one of said elements having an overlapping sealing flange overlapping the edge of the other element to seal said elements together.

7. A connector for connecting adjacent passages in a heat exchanger having a plurality of conduits which comprises a multiple tube adapter element projecting into two or more conduits and a cooperating cover element, one of said elements having a flange, the other element being secured to said flange and forming a fluid tight conduit between said passages.

8. A connector for connecting adjacent passages in a heat exchanger having a plurality of conduits, which comprises a multiple tube adapter projecting into two or more conduits, a flange element on said adapter member, a cooperating cover element secured to said flange and forming a fluid tight conduit between said passages, said adapter member extending above the adjacent fin element, said cover member being provided with a flange projecting underneath the flange of the adapter element.

9. An individual header for adjacent fluid passages which comprises an adapter element having projections cooperating with the fluid passages, the sides of said adapter extending substantially above said adapter, and a cover element projecting downwardly into said adapter and secured to said adapter along with the projecting sides thereof to form a transverse fluid conduit.

10. A connector for connecting adjacent passages in the core of an integral fin and tube type radiator in continuous relation, which comprises an adapter element having projections cooperating with adjacent conduits, said adapter member closely fitting the radiator core, a cover element surrounding said adapter and having extended flanges around its edges, said adapter element also having extended flanges cooperating with the flanges on said cover element, and means to make said flanges fluid tight.

11. A heat exchange unit of the class described comprising a plurality of telescoped tubular projections and integral fins forming separated passages in parallel spaced relation, and sheet metal header means secured to the end fins of said passages to connect respective adjacent passages together, and extensions on said header means to support said heat exchange unit.

12. A heat exchange unit of the class described comprising a plurality of transverse tubular conduits, means to connect certain of said conduits into a single fluid path comprising an adapter element extending into the ends of the tubular conduits, and a unitary cover element, said cover element having a plurality of drawn pockets cooperating with respective tubular conduits, and means to seal said cover element to said adapter element.

13. In a heat exchange unit of the class described means to connect a plurality of fluid conduits into a single fluid path comprising an adapter element extending into the conduits and a cover element integrally secured to said adapter element and forming a part of the common fluid path.

14. In a heat exchange unit of the integral fin and tube type having a plurality of telscoped tubular projections and integral fins, the combination of an adapter element mounted between the end two fins and tube elements, a cover element cooperating with a plurality of tubular conduits to form a common fluid path therewith, and means to seal said cover element to said adapter element.

15. A heat exchange unit of the class described comprising a pressed metal core having a plurality of transverse conduits, means to connect three or more of said fluid conduits into a single path, said means including a sheet metal element, and means to secure said element to said core.

16. A heat exchange unit of the integral fin and tube type including connector means to connect a plurality of conduits into a common path, said connector means including a common strip on the outside of the unit and a reinforcing element mounted between the last two fins of the unit, said common strip and reinforcing element being secured together whereby said connector means is integrally secured to said heat exchange unit, a portion of said strip extending beyond the edge of the heat exchange unit and acting as a support therefor.

17. In a heat exchange element of the class described having a plurality of tubular liquid passages, means for connecting one passage with another, comprising an adapter member extending from one tubular passage to the other and projecting into the tubular passages and a cover member secured to the adapter and forming with the adapter a passage from one tubular passage to the other, and means to reinforce said adapter element whereby high pressures may be used in said tubular passages.

18. A connector for connecting adjacent passages in a heat exchanger having a plurality of conduits which comprises a multiple tube adapter element projecting into two or more conduits and a cooperating cover element, one of said elements having a flange, the other element being secured to said flange and forming a fluid tight conduit between said passages, said connector having a full flow, non-turbulent interior.

19. An individual header for adjacent fluid passages which comprises an adapter element having projections cooperating with the fluid passages, the sides of said adapter extending substantially above said adapter, and a cover element projecting downwardly into said adapter and secured to said adapter along with the projecting sides thereof to form a transverse fluid conduit, said cover being semi-circular in major diameter for full flow.

JOHN KARMAZIN.